May 14, 1968  ISOROKU KINOSHITA  3,382,853

TWO-CYCLE ENGINE HAVING CRANKCASE SCAVENGING

Filed Dec. 13, 1966  3 Sheets-Sheet 1

INVENTOR.

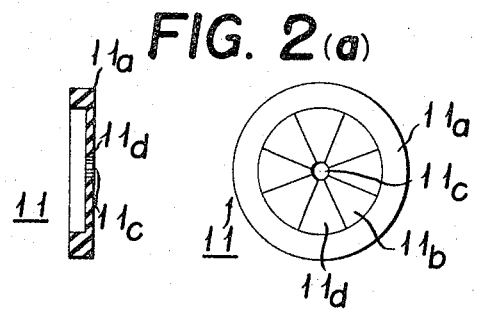
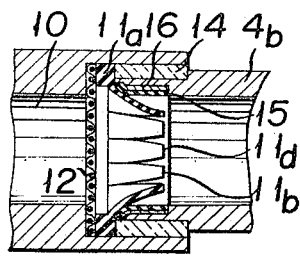
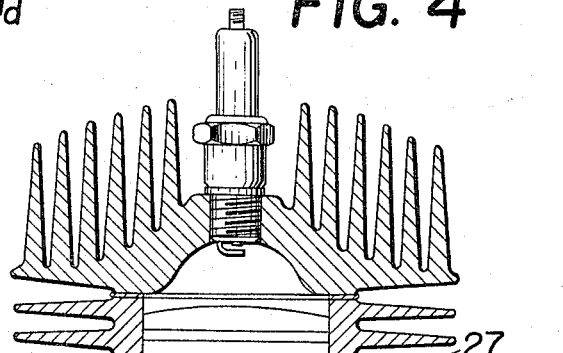
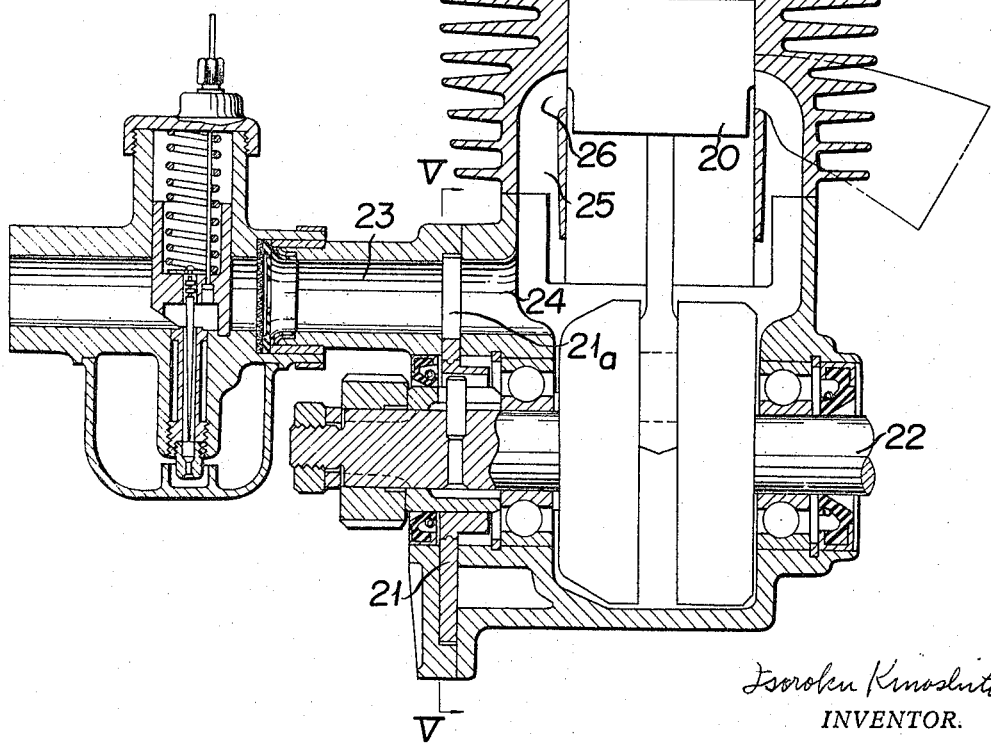

May 14, 1968 ISOROKU KINOSHITA 3,382,853
TWO-CYCLE ENGINE HAVING CRANKCASE SCAVENGING
Filed Dec. 13, 1966 3 Sheets-Sheet 3
FIG. 5
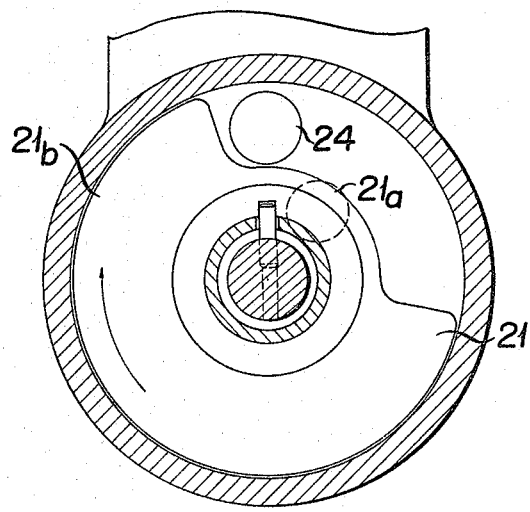
FIG. 6
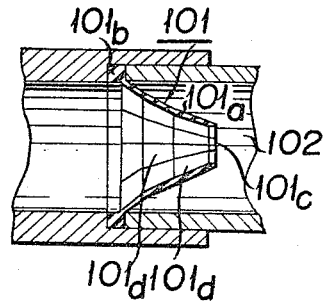
FIG. 7
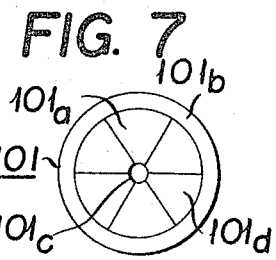
FIG. 8
FIG. 9
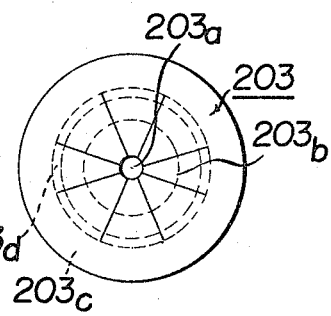
Isoroku Kinoshita
INVENTOR.
by Georges Aujeroth
Attorney

United States Patent Office 3,382,853
Patented May 14, 1968

3,382,853
TWO-CYCLE ENGINE HAVING CRANKCASE SCAVENGING
Isoroku Kinoshita, Hamakita-shi, Japan, assignor to Yamaha Hatsudoki Kabushiki Kaisha, Hamamatsu-shi, Shizuoka-ken, Japan, a corporation of Japan
Filed Dec. 13, 1966, Ser. No. 601,381
Claims priority, application Japan, Dec. 16, 1965, 40/77,019; Apr. 13, 1966, 41/22,951, 41/22,952, 41/22,953
17 Claims. (Cl. 123—73)

This invention resides in a two-cycle engine with crankcase scavenging provided with a blowback preventer which is disposed in an intake passage connected with an intake port of the crankcase for preventing blowback of fuel mixture or clean air from the crankcase in spite of the late shutter timing of an intake valve disposed in the intake passage.

The present invention relates to two-cycle engines with crankcase scavenging having a blowback preventer to prevent blowback of fuel mixture or clean air taken in the crankcase.

In two-cycle gasoline engines and two-cycle diesel engines, the ways in which as much fuel mixture or clean air as possible is sucked in the crankcase as per unit volume of the cylinder and it is brought to perfect combustion are the vital factors in determining their output. In two-cycle engines with crankcase scavenging the piston valve is typical of the intake or suction valves connected to the inlet port for the purpose of sucking fuel mixture or clean air in the crankcase and compressing the same. In recent years rotary valves have become employed as intake valve in the industry. The timing of closing and opening of the intake valve is predetermined solely in connection with the reciprocating motion of the piston of the engine to obtain optimum charge trapping efficiency. Generally, in cases of two-cycle gasoline engines, fuel mixture from the carburetor enters the crankcase through the intake passage, while with two-cycle diesel engines clean air enters the crankcase through the intake passage. In either case the closure timing of the intake valve is set such that the intake valve closes the inlet port slightly after the commencement of its downward stroke, to continue sucking fuel mixture or clean air in the crankcase until the flow of the fuel mixture or clean air through the intake passage is stopped by the increasing counter pressure within the crankcase opposing the momentum of the charge flowing through the intake passage. The shutter timing of the above intake valve is usually set solely to meet the most frequently usable normal speed of the engine. And a rotary valve system is more appropriate in this respect in that timing of opening and closure can be determined independently from each other. When the engine is driven at a speed lower than the normal speed, however, any of the rotary and piston valves can not prevent the so called "blowback" of fuel mixture or clean air from the crankcase back into the intake passage, because of the fact that with a reduced speed a flow of the charge through the intake passage is reduced to reduce the momentum of the charge, resulting in earlier termination of the suck-in operation of the charge before the inlet port closes, so that a part of the charge supplied in the crankcase is caused disadvantageously to return to the intake passage till the inlet port is closed by a downward stroke of the piston. This phenomenon not only leads to a decrease in the trapping efficiency, but also, particularly in two-cycle gasoline engines, causes the fuel component or gasoline in the fuel mixture blown back into the intake passage to adhere and thereby choke an air cleaner, thus resulting in an increase in the intake resistance when repeated for a lengthy period of time. This will result in the increase of fuel consumption.

In connection with this "blowback," any of these rotary and piston valves brings forth a problem of lowering the trapping efficiency in high-speed operation of the engine. The time interval during which the inlet port is open decrease as the rotative speed of the engine increases, so that the trapping efficiency will be lowered less than the normal speed unless the rate of supply of the charge per unit time is correspondingly increased. The increase of the rate of the charge supply may be attained by designing the open area of the intake passage to be relatively large, but such a design will result in a correspondingly greater decrease in the flow speed of the charge to be sucked in the crankcase during low-speed operation of the engine and in an increase in the amount of the blow-back to extremely lower the trapping efficiency. Under these conditions of the low-speed operation, it is not expected that a sudden enlargement of the throttle opening is accompanied with a corresponding increase in the rotative speed of the engine.

The primary object of this invention is to provide a two-cycle engine with crankcase scavenging comprising an inlet port provided in a crankcase to connect the crankcase with an intake passage and an intake valve which opens and closes said inlet port in response to stroke of a piston, wherein a check valve mean having a small resistance to the flow of fuel mixture or clean air to be sucked in the crankcase is provided in the intake passage, the check valve means having an opening which is capable of being enlarged in accordance with the speed of flow of the charge through the intake passage, in order to prevent blowback of the charge from the crankcase during low-speed engine operation and increase the rate of supply of the charge to the crankcase during high-speed engine operation.

Another object of this invention is to provide a two-cycle engine with crankcase scavenging and with blow back preventer means, comprising an intake passage, an inlet port provided in the crankcase to connect the latter with said intake passage, and an intake valve which opens and closes said inlet port in response to strokes of a piston, wherein said intake passage has a check valve whose opening is so constructed that the open area of the intake passage may be enlarged or reduced in conformity with the flow speed of a gaseous medium to be sucked in the crankcase, said check valve having a less flow resistivity against the gaseous medium, whereby the blow back of gas in low speed operation can be prevented and the rate of supply of the gas into the crankcase per unit time in high speed operation can be increased.

Other objects and various features of this invention will become apparent from the following description in conjunction with some embodiments of the invention with reference to the accompanying drawings in which:

FIG. 2a is a sectional view illustrating in an enlarged scale a valve member of the blowback preventer shown in FIG. 1;

FIG. 2b is a front elevation of the valve member shown in FIG. 2a;

FIG. 3 is a section similar to FIG. 1 illustrating the valve member in an open state during which fuel mixture is sucked in the crankcase;

FIG. 4 is a longitudinal section illustrating a two-cycle engine with crankcase scavenging of rotary disc-valve type provided with a blowback preventer in accordance with this invention;

FIG. 5 is a section taken along line V—V of FIG. 4;

FIG. 6 is a longitudinal section illustrating a variety of the check valve assembly of the blowback preventer;

FIG. 7 is a front elevation of the check valve assembly shown in FIG. 6;

FIG. 8 is a longitudinal section illustrating another variety of the check valve assembly; and FIG. 9 is a front elevation of the check valve assembly shown in FIG. 8.

Figure 1:
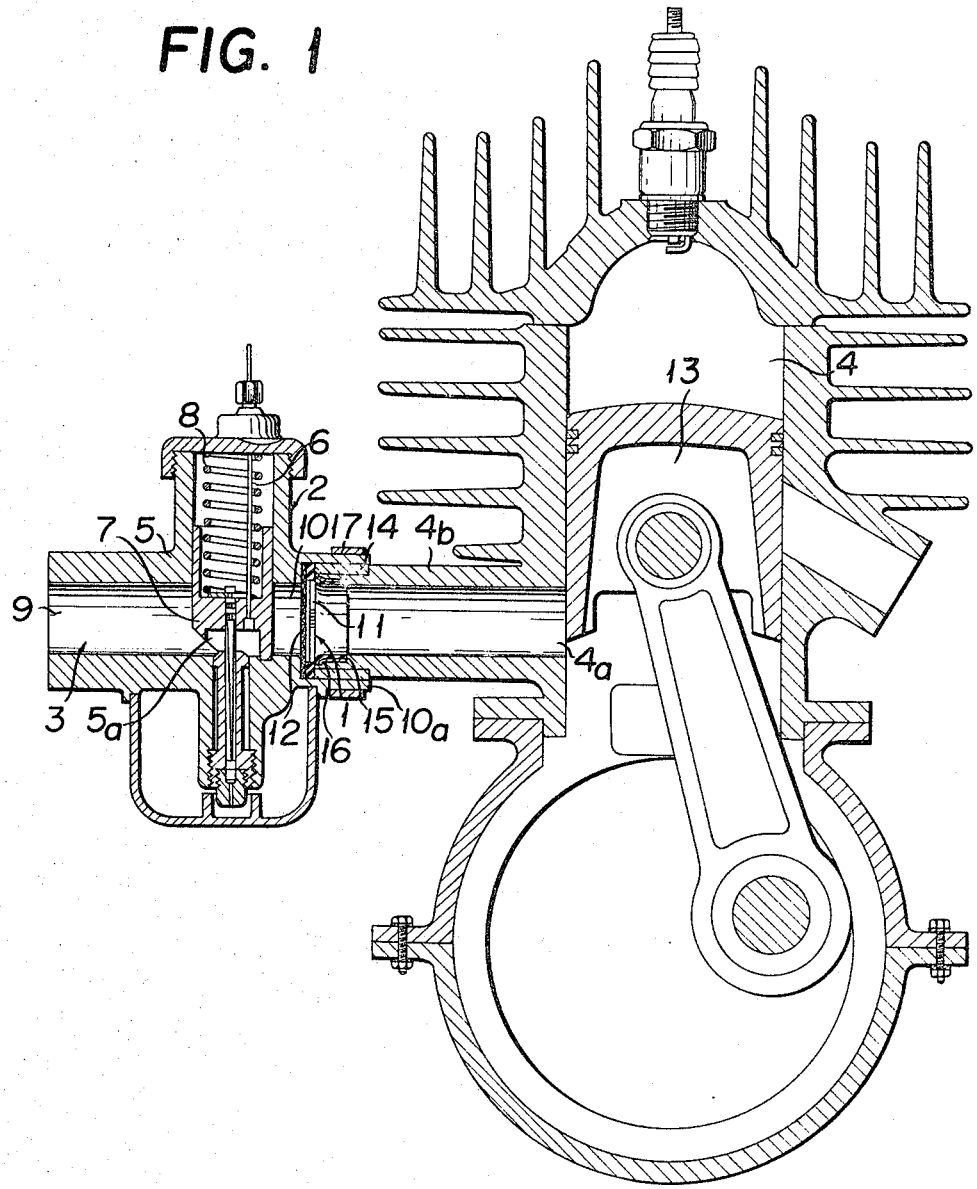
FIG. 1 is a longitudinal section illustrating a portion of a two-cycle gasoline engine with crankcase scavenging of piston valve type provided with a blowback preventer according to the invention.

Referring now to FIGS. 1 to 3, the blowback preventer in accordance with this invention comprises a check valve assembly 1 disposed in an intake passage 3 between a carburetor 2 and a cylinder 4. The carburetor 2 comprises a body 5 in which is mounted a throttle valve 7 whose opening is controlled by operating a throttle control wire 6, the throttle valve 7 being urged by a slide spring 8 in the direction of closing the intake passage 3. This structure is conventional. The inside of the body 5 is partitioned by the throttle valve 7 into two parts respectively consisting of tubes 9 and 10 which are integral with the body 5 and which respectively form a part of said passage 3 at the inlet and outlet of the throttle valve 7. Adjacent the end of the tube 10 remote from the throttle valve 5 is formed an annular opening 10a having a slightly larger diameter than the inner diameter of the rest of the tube 10 and on which the check valve assembly 1 is mounted. Said check valve assembly 1 in the check valve assembly consisting of valve member 11 having its circular edge located in the annular opening 10a and disposed in the intake passage 3, and a metal net 12 disposed in the close vicinity of the valve member 11 and on the side nearer the throttle valve 7. The valve member 11 consists of a peripheral portion 11a having a sufficient thickness to provide mechanical strength and a center portion 11b which is a membraneous disc having a center hole 11c and radially cut into a plurality of sectors 11d.

In the figure the reference numeral 13 indicates a piston reciprocating within the cylinder 4 also serving as a part of the piston valve system. The reciprocating movement causes the piston 13 to cover and uncover an inlet port 4a open to the cylinder block from an intake duct 4b outwardly extending from the cylinder block. The intake duct 4b is snugly mounted in annular portion 10a through the agency of a heat-insulating resilient gasket 14 and secured to the tube 10 by fastening a hand belt 17. The free end of the intake duct 4b is formed with a stepped large-diameter portion in which is mounted a metal ring 16 whose inner side is affixed with a protecting rubber ring 15 by heat treatment. The valve member 11 and the metal net 12 and held in the deepest place in the annular opening 10a by the free end of the intake duct 4b. The protecting rubber ring 15 is provided in order to absorb impingement of the sectors 11d upon the inner walls of the intake duct, and it has such a configuration that its inner diameter progressively increase toward extending the peripheral portion 11a so that it may have a smooth arcuately curved fact extending from the root of the sectors 11d or from a portion close to the circular edge 11a.

The shutter timing by the piston 13 of the inlet port 4a is strictly set at the time at which the trapping efficiency of the engine at the normal speed is maximum, that is the time where the inertia of the mixture led to the inlet port 4a through the intake passage 3 may be counterbalanced by the increase of pressure of the cylinder within the crankcase by a down stroke of the piston and where the flow of the mixture in the intake passage 3 is stopped.

In operation, when the inlet port 4a is cleared by the upward stroke of the piston 13, the fuel mixture passing through the carburetor 2 under the action of the throttle valve 7 rushes through the valve member 11 and the inlet port 4a in the cylinder block. During this time the open area of the valve member 11 is enlarged according to the speed of flow of the fuel mixture passing therethrough. In high speed operation of the engine the flow speed of the fuel mixture passing through the valve member 11 increases and a correspondingly increased momentum of the fuel mixture causes the sectors 11d to be sufficiently bent to such an extent as shown in FIG. 3, which practically increases the open area of the tube 10 to increase the rate of supply per unit time of the fuel mixture to the crankcase, thus improving the trapping efficiency of the engine.

At a rotative speed of the engine lower than the normal speed counter flow of the fuel mixture tends to take place, but when a counter flow pressure is applied to the sectors 11d, the sectors are pushed back to their original positions by virtue of their resiliency to be supported by the metal net 12 so as to check the reverse flow of the fuel mixture by puckering up the open area of the valve. Thus, even if the closure of the inlet port 4a lags the shutter timing at the normal speed, the blowback is prevented by the check valve assembly, so that practical lowering of the trapping efficiency will not occur. Of course, an increase of resistance against the flow of the fuel mixture attributable to the presence of the check valve assembly is not favorable for the carburetor and the intake passage. Accordingly it is desirable to make as small as possible the resistance offered by the check valve assembly 1 during fuel mixture suck-in periods. The lowering of the performance due to the additional resistance may be compensated by so designing the valve member 11 that its open area may be enlarged in the normal speed operation of the engine to such an extent that the normal performance may be assured. The valve member 11 is preferably made from a restorable resilient material such as rubber. Regrading the metal net 12 its mesh size should be taken into consideration inasmuch as the resistance against the flow varies with the mesh size. Of course, the metal net may be replaced with any suitable mechanism so long as it meets its fundamental purpose of preventing the sectors 11d from being reversely bent by the fuel mixture blown back into the intake passage. In the preceding embodiment the heat-insulating resilient gasket 14 used to connect the tube 10 with the intake duct 4b is effecive for preventing conduction of heat from the cylinder block to the corburetor, thereby to prevent carburetor troubles due to overheat.

The foregoing description has been concerned with one embodiment of a two-cycle gasoline engine with crankcase scavenging where a carburetor is provided in the intake passage. In two-cycle diesel engines there is no carburetor and clean air is directly sucked in the crankcase through the intake passage. Also in the previous embodiment, although the check valve assembly of the blowback preventer is installed in the passage between the carburetor and the cylinder block united with the crankcase, it is possible to install the check valve assembly in the passage on the inlet side of the carburetor. In this case the silencing effect of the sucking noise is remarkably enhanced, though the arrangement of the check valve assembly as in the previous embodiment is convenient for preventing variation of oil level in the carburetor.

The installation of the check valve assembly 1 in the intake passage 3 brings about a change of the performance of the intake system of the two-cycle engine as a whole. Sometimes, manufactural errors of the individual parts constituting the intake system have conspicuous influence upon the entire performance. In such a case a small hole formed in the center of the valve member alleviates sharp variations of the performance of the intake system.

FIGS. 4 and 5 illustrate a two-cycle gasoline engine using a rotary disc valve system where a disc-valve 21 cooperating with a piston is mounted on a crankshaft 22 and functions as it rotates, to open and close an intake duct 23. As is seen from FIG. 5, when the intake duct 23 is faced with a notched portion 21a of the disc-valve the inlet port 24 is open, whereas when the inlet duct is faced with the portion other than the notched portion of the disc-valve the inlet port 24 is closed. In this embodiment the carburetor and the check valve assembly of the blowback preventer are the same as those described above with reference to FIGS. 1 to 3 and hence description thereof is omitted. In the figures the numeral 25 is the transfer passage, 26 the transfer port and 27 the cylinder block.

A modification of the check valve will now be described with reference to FIGS. 6 and 7. A valve member 101 as shown includes a conical membrane 101a whose tip end is directed to an inlet port not shown, and a peripheral portion 101b which is made thick to be readily and positively mounted to the intake passage 102. As is seen from FIG. 7, the conical membrane has hole 101c formed in the tip end thereof and a plurality of sectors 101d radially cut around said tip end. This embodiment requires no metal net as in the previous embodiment. When fuel mixture flows in the direction of arrow A, the valve member 101 is pushed open by the fluid pressure. When the fuel mixture is going to return into the intake passage due to lag of closure of the inlet port in the low speed operation of the engine, the valve member is pushed in the reverse direction, whereupon the sectors 101d are forced to approach one another because of the conical configuration of the valve member so as to close the open area except the hole 101c, thereby substantially preventing the blowback. In the use of the conical valve member of the above type, it is preferable to make thicker the center portions of the sectors 101d while making thinner the peripheral portions of the sectors 101d, so that the center portion of the valve member may have some mechanical strength sufficient to withstand the pressure of the counter flow while the sectors themselves may be readily bent by the forward pressure of the fuel mixture. Alternatively, the valve member may be made uniformly thin and a metal net of conical configuration similar to the configuration of the valve member may be disposed inside the valve member 101. As has been mentioned in the previous embodiment, the valve member 101 is preferably made from a resilient material such as rubber.

In the embodiment shown in FIGS. 8 and 9, the inner diameter of the outlet tube 201 (on the inlet side) of the carburetter is made smaller than the inner diameter of the intake duct 202 communicating with an inlet port, not shown. The valve member 203 is preferably formed from resilient rubber or soft synthetic resin material and is in the form of a disc having a central hole 203a and radially cut into a plurality of sectors 203b. The valve member 203 has a folded flange 203c facing toward the carburetter and placed at the bottom of the annular opening 201a of the tube 201. The valve member 203 is formed with an annular groove 203d adjacent the peripheral portions of the sectors 203d, said annular groove having an outside diameter smaller than the inside diameter of the intake duct 202. The presence of the annular groove 203d makes root portions of the sectors 203b more resilient, so that the valve member 203 is pushed open without exhibiting any appreciable resistance when fuel mixture is sucked in the crankcase. On the other hand when the fuel mixture flows in the reverse direction under "blowback," the flange 203c holds the sectors 203b against bending in the reverse direction, thereby checking the blowback.

As has been made clear by the foregoing embodiment, though the check valve assembly of the blowback preventer according to this invention should have a structure sufficient to prevent counter flow of fuel mixture or clean air, the check valve assembly is subjected to the pressure of the counter flow only for an extremely short interval of time during compression stroke of the piston and after the closure of the inlet port the valve assembly is free from the influence of counter flow, so that the valve assembly may be of relatively light pressure-resistant structure.

While the invention has been described in connection with some preferred embodiments thereof it should be understood to those skilled in the art that many modifications may be made without departing from the true spirit and scope of the invention as defined in the appended claims.

What is claimed is:

1. A two-cycle engine with crankcase scavenging having an inlet port connecting an intake passage which passes mixture or air to a crankcase and an intake valve adapted to close and unclose said inlet port in association with the piston stroke for each piston-cylinder assembly, featuring a blowback preventer consisting of the intake passage and a check valve disposed in said intake passage for preventing blowback of fuel mixture or clean air from the crankcase, said check valve exhibiting small resistance against fuel mixture to be sucked in the crankcase.

2. A two-cycle engine with crankcase scavenging having an inlet port connecting an intake passage with a crankcase and an intake valve adapted to close and unclose said inlet port in association with the piston stroke for each piston-cylinder assembly, featuring a blowback preventer consisting of the intake passage and a check valve disposed in said intake passage, said check valve being adapted such that the open area of said intake passage is enlarged in accordance with the speed of flow of fuel mixture or clean air to be sucked in said crankcase for preventing blowback of fuel mixture or clean air during low-speed operation of the engine and for increasing the rate of supply of fuel mixture or clean air during high-speed operation of the engine.

3. The two-cycle engine according to claim 1 wherein said check valve is installed in said intake passage in direct communication with said inlet port.

4. The two-cycle engine according to claim 2 wherein said check valve is installed in said intake passage in direct communication with said inlet port.

5. The two-cycle engine according to claim 1 wherein said valve member comprises a valve member which is made from a restorable resilient material and which shows very small resistance against the flow of fuel mixture to be sucked in said crankcase to substantially prevent counter flow of fuel mixture from said crankcase.

6. The two-cycle engine according to claim 2 wherein said valve member comprises a valve member which is made from a restorable resilient material and which shows very small resistance against the flow of fuel mixture or clean air to be sucked in said crankcase to substantially prevent counter flow of fuel mixture or clean air from said crankcase.

7. The two-cycle engine according to claim 5 wherein said check valve includes a support structure which holds said valve member against bending in the reverse direction.

8. The two-cycle engine according to claim 6 wherein said check valve includes a support structure which holds said valve member against bending in the reverse direction.

9. The two-cycle engine according to claim 5 wherein said valve member is formed with a central hole.

10. The two-cycle engine according to claim 6 wherein said valve member is formed with a central hole.

11. The two-cycle engine according to claim 7 wherein said valve member is formed with a central hole.

12. The two-cycle engine according to claim 8 wherein said valve member is formed with a central hole.

13. The two-cycle engine according to claim 5 wherein said valve member is of conical shape and cut into a plurality of sectors.

14. The two-cycle engine according to claim 5 wherein said valve member is of disc shape and cut into a plurality of sectors.

15. The two-cycle engine according to claim 7 wherein said valve member is of disc shape and cut into a plurality of sectors.

16. The two-cycle engine according to claim 7 wherein said support structure is a metal net.

17. A two-cycle engine with crankcase scavenging having an inlet port connecting an intake passage with a crankcase and an intake valve adapted to close and unclose said inlet port in association with the piston stroke for each piston-cylinder assembly, featuring check valves each installed in an inlet passage on the inlet side of the carburetter, said check valve exhibiting small resistance against fuel mixture to be sucked in the crankcase.

References Cited

UNITED STATES PATENTS

Re. 19,949   4/1936   Irgens _____ 123—73

FOREIGN PATENTS 764,735   1/1957   Great Britain.

WENDELL E. BURNS, *Primary Examiner.*